(12) United States Patent
Zhao

(10) Patent No.: US 11,316,681 B2
(45) Date of Patent: Apr. 26, 2022

(54) USER IDENTITY AUTHENTICATION METHOD AND DEVICE, READABLE STORAGE MEDIUM AND COMPUTER EQUIPMENT

(71) Applicant: BOE TECHNOLOGY GROUP CO., LTD., Beijing (CN)

(72) Inventor: Zhengong Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 222 days.

(21) Appl. No.: 16/448,153

(22) Filed: Jun. 21, 2019

(65) Prior Publication Data

US 2020/0044839 A1 Feb. 6, 2020

(30) Foreign Application Priority Data

Aug. 2, 2018 (CN) .......................... 201810870285.2

(51) Int. Cl.
*H04L 9/08* (2006.01)
*H04L 9/06* (2006.01)
*H04L 9/30* (2006.01)
*H04L 9/32* (2006.01)

(52) U.S. Cl.
CPC .......... *H04L 9/0866* (2013.01); *H04L 9/0637* (2013.01); *H04L 9/30* (2013.01); *H04L 9/3213* (2013.01); *H04L 9/3236* (2013.01); *H04L 9/3297* (2013.01); *H04L 2209/38* (2013.01)

(58) Field of Classification Search
CPC ....... H04L 9/0866; H04L 9/0637; H04L 9/30; H04L 9/3213; H04L 9/3236; H04L 9/3297; H04L 2209/38

USPC ......................................................... 713/189
See application file for complete search history.

(56) References Cited

U.S. PATENT DOCUMENTS

| | | | |
|---|---|---|---|
| 10,621,339 B2* | 4/2020 | Liao ........................ | G06F 21/52 |
| 2011/0167059 A1* | 7/2011 | Fallah .................... | G06Q 30/08 |
| | | | 707/723 |
| 2016/0330027 A1* | 11/2016 | Ebrahimi ................ | G06F 21/34 |
| 2017/0132630 A1* | 5/2017 | Castinado ............ | G06Q 20/382 |
| 2018/0048461 A1* | 2/2018 | Jutla ...................... | H04L 9/3236 |
| 2018/0078843 A1* | 3/2018 | Tran ...................... | A61B 5/0024 |

(Continued)

FOREIGN PATENT DOCUMENTS

| | | | |
|---|---|---|---|
| CN | 107196966 | * | 9/2017 |
| CN | 107196966 A | | 9/2017 |

(Continued)

OTHER PUBLICATIONS

First Office Action, including Search Report, for Chinese Patent Application No. 201810870285.2, dated Aug. 5, 2020, 23 pages.

*Primary Examiner* — Abiy Getachew
*Assistant Examiner* — Mohammad S Shams
(74) *Attorney, Agent, or Firm* — Westman, Champlin & Koehler, P.A.

(57) ABSTRACT

A user identity authentication method includes: receiving first information input by a user, and obtaining intermediate information of the user from a block-chain; generating second information by using the first information and the intermediate information; and obtaining a matching result by determining whether the second information matches result information stored in the block-chain, and determining whether user identity of the user is valid according to the matching result.

20 Claims, 4 Drawing Sheets

(56) References Cited

U.S. PATENT DOCUMENTS

| | | | | |
|---|---|---|---|---|
| 2018/0137512 A1* | 5/2018 | Georgiadis | | H04L 9/3213 |
| 2018/0309581 A1* | 10/2018 | Butler | | G06Q 50/18 |
| 2019/0349372 A1* | 11/2019 | Smith | | H04L 9/321 |
| 2019/0363889 A1* | 11/2019 | Wang | | H04L 9/0643 |
| 2019/0386975 A1* | 12/2019 | Li | | H04L 9/3247 |
| 2020/0051074 A1* | 2/2020 | Suh | | G06Q 20/385 |
| 2020/0092102 A1* | 3/2020 | Wang | | H04W 12/06 |
| 2020/0118117 A1* | 4/2020 | McManus | | G06Q 10/10 |

FOREIGN PATENT DOCUMENTS

| | | | |
|---|---|---|---|
| CN | 107493273 A | | 12/2017 |
| CN | 107579817 | * | 1/2018 |
| CN | 107579817 A | | 1/2018 |
| CN | 108270780 A | | 7/2018 |

\* cited by examiner

USER IDENTITY AUTHENTICATION METHOD AND DEVICE, READABLE STORAGE MEDIUM AND COMPUTER EQUIPMENT

CROSS-REFERENCE TO RELATED APPLICATION

The present application claims a priority to Chinese Patent Application No. 201810870285.2 filed on Aug. 2, 2018, the disclosure of which is incorporated in its entirety by reference herein.

TECHNICAL FIELD

The present disclosure relates to the field of computers, and in particular to a user identity authentication method and device, a readable storage medium and a computer equipment.

BACKGROUND

At present, common means for the internet to confirm identity of users include: short message secondary confirmation, email secondary confirmation and digital certificate confirmation, etc. These means have the risk of being stolen and forged.

SUMMARY

One embodiment of the present disclosure provides a user identity authentication method. The method includes: receiving first information input by a user, and obtaining intermediate information of the user from a block-chain; generating second information by using the first information and the intermediate information; and obtaining a matching result by determining whether the second information matches result information stored in the block-chain, and determining whether user identity of the user is valid according to the matching result.

In some embodiments, the method further includes: sending a user identifier of the user and the first information to an auxiliary-authentication block-chain node, receiving a matching result returned by the auxiliary-authentication block-chain node. The obtaining a matching result by determining whether the second information matches result information stored in the block-chain, and determining whether user identity of the user is valid according to the matching result, includes: obtaining a matching result for an authentication block-chain node by determining whether the second information matches result information stored in the block-chain; and in combination of the matching result of the authentication block-chain node and matching results returned by auxiliary-authentication block-chain nodes, determining that the identity of the user is valid when there are more than a first number of matching results indicated as matching among the matching result of the authentication block-chain node and the matching results returned by auxiliary-authentication block-chain nodes.

In some embodiments, the matching result returned by the auxiliary-authentication block-chain node is generated by the auxiliary-authentication block-chain node in the way that includes: after the auxiliary-authentication block-chain node receives the user identifier and the first information input by a user from the authentication block-chain node; obtaining the intermediate information of the user from the block-chain; generating third information by using the first information and the intermediate information; determining whether the generated third information matches the result information stored in the block-chain, thereby obtaining the matching result which is returned by the auxiliary-authentication block-chain node.

In some embodiments, the method further includes: receiving temporary parameters returned by the auxiliary-authentication block-chain nodes; and selecting one temporary parameter as a session token of the user from the temporary parameters returned by the auxiliary-authentication block-chain nodes which each return a matching result indicated as matching. The temporary parameters are random numbers generated by the auxiliary-authentication block-chain nodes.

One embodiment of the present disclosure provides a user identity authentication method. The method includes: receiving user identifier and first information input by a user from an authentication block-chain node, and obtaining intermediate information of the user from a block-chain; generating third information by using the first information and the intermediate information; obtaining a matching result by determining whether the third information matches the result information stored in the block-chain; and returning the matching result to the authentication block-chain node.

In some embodiments, the method further includes: generating a random number as a temporary parameter, and returning the temporary parameter to the authentication block-chain node.

One embodiment of the present disclosure provides an identity authentication device that includes: a first receiving circuit, an intermediate information obtaining circuit, a second information generating circuit and an identity authentication circuit. The first receiving circuit is configured to receive first information input by a user. The intermediate information obtaining circuit is configured to obtain intermediate information of the user from a block-chain. The second information generating circuit is configured to generate second information by using the first information and the intermediate information. The identity authentication circuit is configured to determine whether the second information matches result information stored in the block-chain to obtain a matching result, and determine whether the user identity of the user is valid according to the matching result.

In some embodiments, the identity authentication device further includes a first sending circuit; the first sending circuit is configured to send the first information received by the first receiving circuit and the user identifier of the user to an auxiliary-authentication block-chain node; the first receiving circuit is further configured to receive a matching result returned from the auxiliary-authentication block-chain node; the identity authentication circuit is further configured to determine whether the second information matches the result information stored in the block-chain to obtain a matching result for the authentication block-chain node; in combination of the matching result of the authentication block-chain node and matching results returned by auxiliary-authentication block-chain nodes, determine that the identity of the user is valid when there are more than a first number of matching results indicated as matching among the matching result of the authentication block-chain node and the matching results returned by the auxiliary-authentication block-chain nodes.

In some embodiments, the first receiving circuit is further configured to receive a temporary parameter returned by the auxiliary-authentication block-chain node; the temporary parameter is a random parameter generated by the auxiliary-authentication block-chain node. The identity authentication device further includes a token selection circuit; the token selection circuit is configured to select one temporary parameter as a session token of the user from temporary parameters returned by the auxiliary-authentication block-chain nodes which each return a matching result indicated as matching.

In some embodiments, the identity authentication device further includes: a second receiving circuit and a result generation circuit. The second receiving circuit is configured to receive user identifier and first information input by the user sent from the authentication block-chain node. The result generation circuit is configured to generate third information by using the first information and the intermediate information, determine whether the third information matches the result information stored in the block-chain to obtain a matching result, and return the matching result to the authentication block-chain node.

In some embodiments, the identity authentication device further includes: a temporary parameter generation circuit configured to generate a random parameter as a temporary parameter and return the temporary parameter to the authentication block-chain node.

One embodiment of the present disclosure provides a computer readable storage medium including a computer program stored thereon. The program is executed by a processor to implement steps of the above method.

One embodiment of the present disclosure provides computer equipment including: a memory, a processor, and a computer program stored in the memory and executable on the processor. The processor implements steps of the above method when executing the program.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

Figure 1:
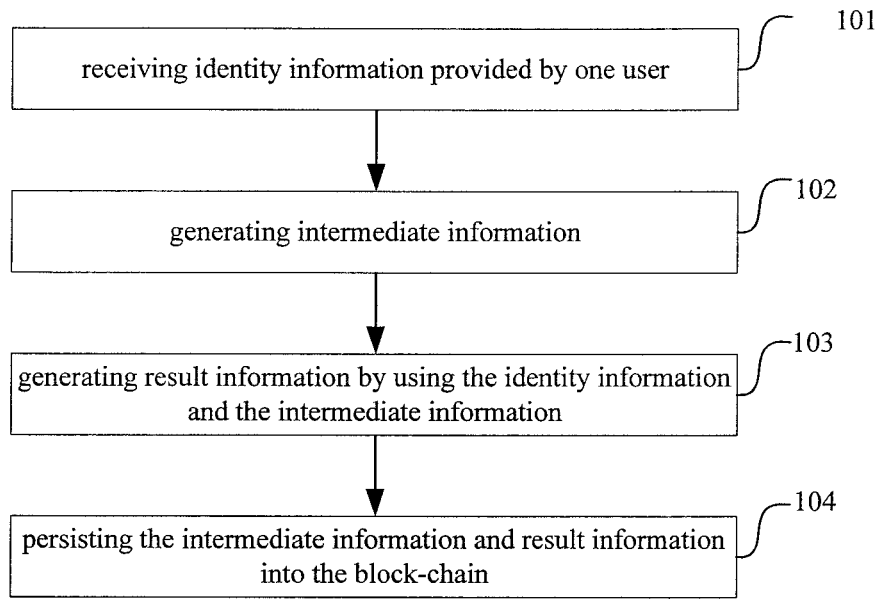
FIG. 1 is a flowchart of user registration according to an embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

The authentication means such as the short message secondary confirmation, the email secondary confirmation and the digital certificate confirmation, have the risk of being stolen and forged. For example, when one user's mobile phone is lost, or the user's mailbox or digital certificate is stolen, user identity may be impersonated by criminals. Inventors of the present disclosure have researched the related art and found that unreliability in carriers that provide user authentication information, results in a decrease in the security and reliability of user account.

In order to ensure reliability of user identity authentication, one embodiment of the present disclosure introduces the block-chain technology into the identity authentication. The block-chain adopts distributed accounting and storage without centralized hardware or management mechanism. Data blocks in the system are jointly maintained by nodes with maintenance functions in the entire system. Once information is verified and added to the block-chain, the information will be stored permanently, with minimal tampering, high data stability and reliability. Therefore, using the block-chain as the carrier of user authentication information can greatly improve the reliability of user identity authentication.

Some embodiments of the present disclosure are directed to the following scenarios in which one user needs to be authenticated, including but not limited to: a scenario in which the user identity needs to be authenticated twice and a scenario in which the user forgets the password and needs to retrieve the password.

For the scenario in which the user identity needs to be authenticated twice, for example, after the user has logged in to the system through the user name and password, the system needs to perform secondary authentication on the user identity when performing some important operations.

The above important operations include operations that may cause serious consequences, such as the transfer of property (such as transfer), user privacy disclosure (such as viewing important user information, including but not limited to viewing bank card number or ID number), account security (such as modification password).

For the scenario in which the user forgets the password and needs to retrieve the password, in some embodiments of the present disclosure, each block in the block-chain stores data of one user or multiple users, and the block is generated and persisted into the block-chain when the user registers. When multiple users are simultaneously registered, data of multiple users may be stored in one block. Blocks in the block-chain are arranged in chronological order. Except for a first block, a block header of each block includes a hash value of a previous block and a hash value of the each block, so that all blocks are linked together like a chain. A block body of each block includes the user's intermediate information and result information. The intermediate information may be provided by the user when registering, or may be generated by one node. The result information may be generated via algorithms based on identity information and the intermediate information. The identity information may be provided by the user when the user registers.

Although the block-chain may be used as the carrier of the user authentication information in some embodiments of the present disclosure, it is not that all information is stored in the block-chain and then simple matching is performed only by one block-chain node. Instead, the user needs to provide some information, and this information is calculated with the intermediate information on the block-chain and then matched with the result information on the block-chain to obtain the authentication result. Or, the authentication result may be obtained by obtaining a calculation result via calculation based on the information provided by the user and the intermediate information on the block-chain and then comparing the calculation result with one or more calculation results of other nodes.

As compared with the simple matching solution, according to the solution of some embodiments of the present disclosure, the authentication result is reliable, the guessing attack can be avoided, and the leakage of the result information can be prevented.

The process of pre-storing intermediate information and result information into the block-chain will describe hereinafter. This process may occur in the process of user registration, or may be set after the user validly logs in. As shown in FIG. 1, the process includes the following steps 101-104.

The step 101 is to receive identity information provided by one user.

In this step, in addition to providing the identity information by the user, in some embodiments, a current node may provide several pieces of alternative information, and then the user may select one from the pieces of alternative information as the identity information.

The identity information is different from user identifier and is used to perform secondary authentication on the user identity when the user performs an important operation or used to authenticate the user identity during the process of retrieving the password. The identity information may be a word, a term, a sentence, a number, or a combination of thereof.

In some embodiments of the present disclosure, there is no special requirement for the length and format of the identity information, as long as the user can remember the information. Meanwhile, this step may optionally include: prompting the user that the identity information is important information required for performing important operations or retrieving passwords.

The step 102 is to generate intermediate information.

In this step, in addition to generating the intermediate information by the current node, in some embodiments, the intermediate information may be provided by the user, i.e., requiring the user to provide the intermediate information. However, the user does not need to remember the intermediate information.

One method for generating the intermediate information by the current node may include, for example, generating a random number, a random word or a random term by using a random code generator such as a random number generator, or, performing some calculation on the identity information provided by the user to obtain intermediate information, or generating the intermediate information via an algorithm based on related information when the user registers. The related information includes at least one of the following: user name, registration time, client address, server address, and the like. In some embodiments, when the alternative information is provided by the node, one of the pieces of alternative information not selected by the user may also be selected as the intermediate information. There is a plurality of ways for generating the intermediate information, which are not limited in the embodiments of the present disclosure.

The step 103 is to generate result information by using the identity information and the intermediate information.

There are a variety of algorithms for generating the result information, which are not limited in the embodiments of the present disclosure. In one embodiment, after hashing the identity information and the intermediate information by using a hash algorithm, the obtained hash value is used as the result information.

The step 104 is to persist the user identifier and the corresponding intermediate information and result information into the block-chain.

This step includes constructing a block body and a block header. The block body stores the intermediate information and the result information, which may be stored in a key-value format, such as user identifier-intermediate information, user identifier-result information. At least the hash value of the previous block, the hash value of the block and the timestamp information are saved in the block header.

Optionally, the correspondence relationship between the user identifier of the user and the block header information may be recorded. The user identifier may be, for example, a user name of the user, or a user code uniquely identifying the user within the block-chain.

The persistence operation may be performed by the current block-chain node or by a block-chain node with persistent permissions. After the persistence operation, each of block-chain nodes synchronizes the block to itself. Signing is performed with the user's private key when persisting. The persistence process belongs to the common technical means for those skilled in the art, and will not be described herein.

After the above process, the user's intermediate information and the result information have been already on the chain and cannot be tampered with for authentication.

The process of user identity authentication will be described hereinafter.

Figure 2:
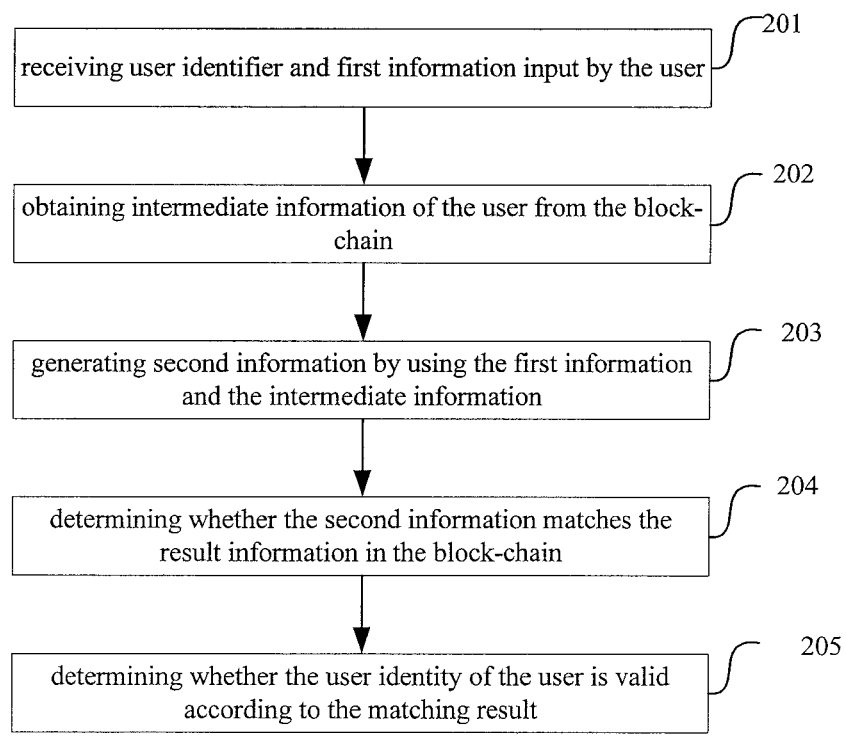
FIG. 2 is a flowchart of authenticating user identity at an authentication block-chain node according to an embodiment of the present disclosure.

Based on the above mentioned scenarios, the following identity authentication process can be used in any scenario. As shown in FIG. 2, when the identity authentication process is applied to the authentication block-chain node, the identity authentication process includes the following steps 201-205.

The step 201 is to receive an authentication request from the user. The authentication request at least includes the user identifier and first information entered by the user.

The first information may be sent to a current node (i.e., authentication block-chain node) in the form of an authentication request. The current node may be a block-chain node that is registered by the user, or may be another block-chain node. When the current node is a block-chain node that is not registered by the user, the authentication request may further include block header information of one block in which information required for authentication is located, that is, the pre-recorded block header information corresponding to the user's user identifier.

Those skilled in the art can know that the authentication request can be encrypted by a user private key, and the block-chain node can decrypt the authentication request by using a user public key.

If the user is a valid user, the first information provided by the user should be the same as the identity information.

The step 202 is to obtain intermediate information of the user from the block-chain according to the user identifier.

The block-chain node can use the public key to perform signature verification on the authentication request. After the verification is passed, the intermediate information of the user can be read according to the user identifier. Since the intermediate information and the result information are stored in the block body in the form of a key-value such as "user identifier-intermediate information" and "user identifier-result information", the intermediate information and the result information corresponding to the user can be found according to the user identifier.

The step 203 is to generate second information by using the first information and the intermediate information.

The method of generating the second information is the same as the algorithm in the step 103.

The step 204 is to determine whether the second information matches the result information pre-stored in the block-chain.

The result information pre-stored in the block-chain may be obtained in the above step 202, or may also be obtained after the second information is obtained via calculation. Determining whether the second information matches the result information pre-stored in the block-chain refers to determining whether the second information is consistent with the result information pre-stored in the block-chain. When the second information is consistent with the result information pre-stored in the block-chain, it is determined that the second information matches the result information pre-stored in the block-chain. When the second information is not consistent with the result information pre-stored in the block-chain, it is determined that the second information does not match the result information pre-stored in the block-chain.

The step 205 is to determine whether the user identity of the user is valid according to the matching result.

When the matching result is matched, it indicates that the user identity is valid. When the matching result is not matched, it indicates that the user identity is invalid.

Based on the above user identity authentication method, the information provided by the user is calculated with the intermediate information on the block-chain, then whether the calculation result matches the result information in the block-chain is determined, and then whether the user identity of the user is valid according to the matching result is determined. As compared with the short message secondary confirmation, the email secondary confirmation and the digital certificate confirmation in the related art, using the block-chain as the carrier of user authentication information in some embodiments of the present disclosure is more reliable than mobile phones, mailboxes and U shields.

Figure 3:
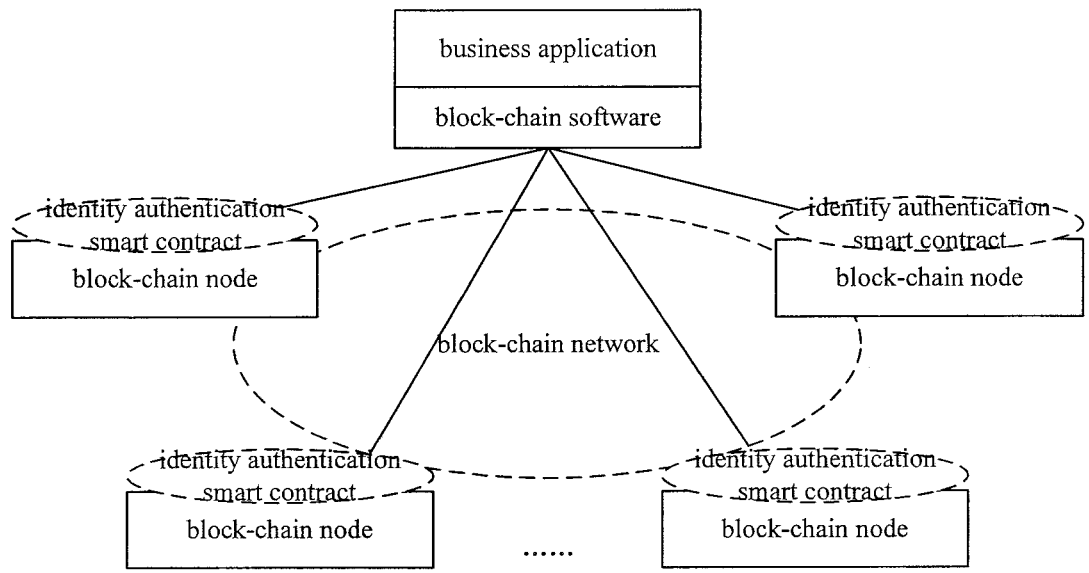
FIG. 3 is a schematic diagram of a block-chain node network according to an embodiment of the present disclosure.

The above authentication method shown in FIG. 2 is an authentication performed by one block-chain node. In order to further ensure reliability and avoid inaccurate authentication results caused by the one block-chain node being tampered with, a multi-node authentication mechanism may also be adopted. For example, the block-chain network is shown in FIG. 3. Each block-chain node is provided with a smart contract. The smart contract is a computer program that is triggered based on predetermined events, cannot be tampered with, and automatically executed. The information is received and matched by the smart contract.

Figure 4:
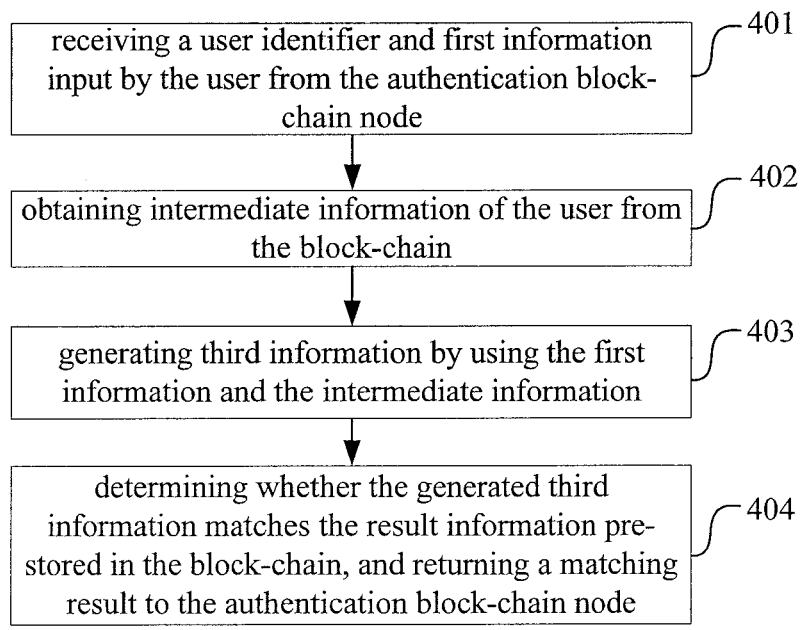
FIG. 4 is a flowchart of authenticating user identity at an auxiliary-authentication block-chain node according to an embodiment of the present disclosure.

In one embodiment, one block-chain node that receives the user's authentication request may be referred to as an authentication block-chain node, and other block-chain nodes that participate in the authentication may be referred to as auxiliary-authentication block-chain nodes. As shown in FIG. 4, an auxiliary authentication process applied to the auxiliary-authentication block-chain node includes the following steps 401-404.

At the step 401, the authentication block-chain node sends a user identifier of a to-be-authenticated user and first information input by the to-be-authenticated user to the auxiliary-authentication block-chain node. The authentication block-chain node may select multiple auxiliary-authentication block-chain nodes according to preset rules, or randomly select n other block-chain nodes as auxiliary-authentication block-chain nodes.

In some embodiments, the auxiliary authentication process of the multiple auxiliary-authentication block-chain nodes may be performed simultaneously with the authentication process shown in FIG. 2. For example, the auxiliary authentication process may be started after the step 201, that is, the step 401 is performed after the step 201; or, the auxiliary authentication process may be started after the step 204. The auxiliary authentication process may also be performed at other times, as long as the auxiliary authentication process is executed before the step 205.

The authentication block-chain node may also send the pre-recorded block header information corresponding to the user identifier of the user to the auxiliary-authentication block-chain node.

At the steps 402-403 which are similar to the steps 202-203, the auxiliary-authentication block-chain node that receives the first information of the user, obtains the intermediate information of the user from the block-chain, and generates third information by using the first information and the intermediate information.

At the step 404, whether the generated third information matches the result information pre-stored in the block-chain is determined, and a matching result is returned to the authentication block-chain node.

With the above multi-node authentication mechanism, when the authentication block-chain node determines whether the user identity is valid in the step 205, it is determined not only according to the matching result of the authentication block-chain node, but also in combination with the matching results of other auxiliary-authentication block-chain nodes. When there are more than a predetermined number (also referred to as a first quantity) of matching results indicated as matching among all matching results, the identity of the user is determined to be valid. The predetermined number may be, for example, half of all the authentication nodes, that is, whether the user is valid determined by using a majority policy.

The above multi-node authentication mechanism can further ensure the reliability of the authentication and avoid the inaccurate authentication result caused by one block-chain node being tampered with.

Figure 5:
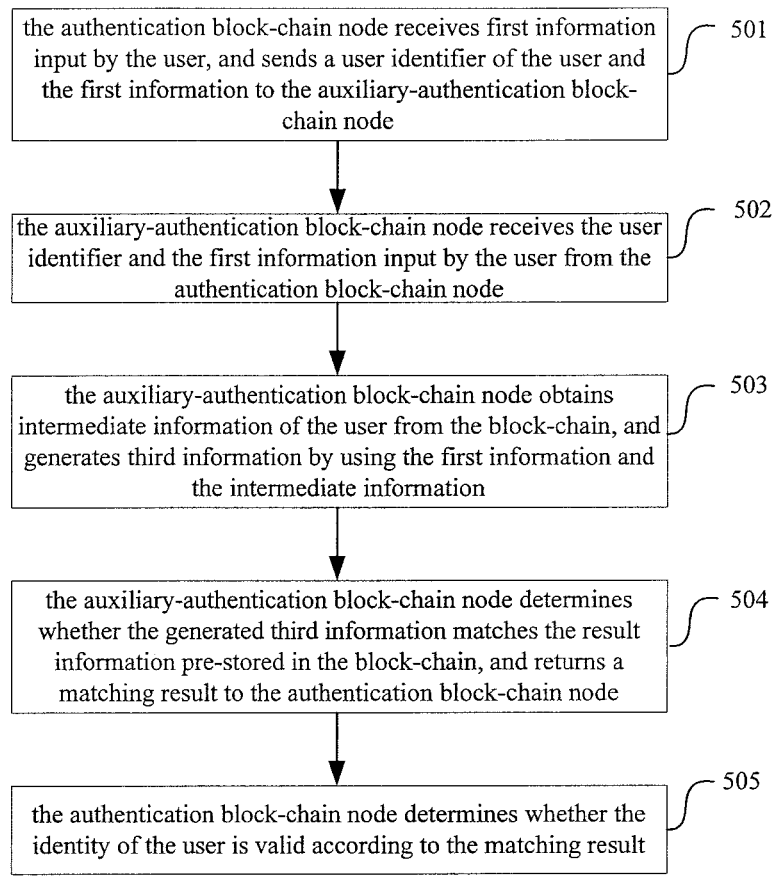
FIG. 5 is a flowchart of authenticating user identity at the authentication block-chain node and the auxiliary-authentication block-chain node according to an embodiment of the present disclosure.

In addition to the above schemes of authentication performed by the authentication block-chain node and authentication performed by the authentication block-chain node and the auxiliary-authentication block-chain node, in one embodiment, another auxiliary authentication scheme may be employed, i.e., the auxiliary-authentication block-chain node performs matching and the authentication block-chain node performs authentication. The specific process is shown in FIG. 5 and includes the following steps.

At the step 501, the authentication block-chain node receives first information input by the user, and sends a user identifier of the user and the first information to the auxiliary-authentication block-chain node.

At the step 502, the auxiliary-authentication block-chain node receives the user identifier and the first information input by the user sent from the authentication block-chain node.

At the step 503, the auxiliary-authentication block-chain node obtains intermediate information of the user from the block-chain, and generates third information by using the first information and the intermediate information.

The auxiliary-authentication block-chain node may index the block-chain according to pre-obtained block header information, and obtain corresponding intermediate information from the block according to the user identifier. The block header information may be sent by the authentication block-chain node to the auxiliary-authentication block-chain node, or may be stored in a predetermined location and obtained by the auxiliary-authentication block-chain node itself.

At the step 504, the auxiliary-authentication block-chain node determines whether the generated third information matches the result information pre-stored in the block-chain, and returns a matching result to the authentication block-chain node.

At the step 505, the authentication block-chain node determines whether the identity of the user is valid according to the matching result.

There may be one or more auxiliary-authentication block-chain nodes. When there is only one auxiliary-authentication block-chain node and the matching result is matched, the authentication block-chain node determines that the user identity is valid. When the matching result is not matched, the authentication block-chain node determines that the user identity is invalid. When there are several auxiliary-authentication block-chain nodes and when there are more than a predetermined number (for example, half of all the all matching results) of matching results indicated as matching among all matching results, the authentication block-chain node determines that the user identity is valid; otherwise, the authentication block-chain node determines that the user identity is invalid.

In the above process, the steps 501 and 505 are operations performed by the authentication block-chain node, and the steps 502-504 are operations performed by the auxiliary-authentication block-chain node.

On the basis of the foregoing embodiment, optionally, on the basis of the multi-node authentication mechanism, each auxiliary-authentication block-chain node may further generate a temporary parameter for the to-be-authenticated user, and return the temporary parameter as well as one of the matching result and the second information back to the authentication block-chain node. The temporary parameter is a parameter generated by the auxiliary-authentication block-chain node. The temporary parameter may be generated by a preset algorithm, or the temporary parameter may also be a random number generated by the auxiliary-authentication block-chain node. Timing of generating the temporary parameter is not limited in one embodiment of the present disclosure, as long as the temporary parameter is generated before it is returned to the authentication block-chain node.

After the authentication block-chain node receives the temporary parameters fed back by other auxiliary-authentication block-chain nodes and after the user identity is authenticated as valid, the authentication block-chain node selects one of the received temporary parameters as a session token of the user. Specifically, one temporary parameter may be selected as the session token of the user from the temporary parameters returned by the auxiliary-authentication block-chain nodes which each return a matching result indicated as matching. For example, when there are x auxiliary-authentication block-chain nodes which each returns a matching result indicated as matching, one temporary parameter may be selected as the session token of the user from the x temporary parameters returned by the x auxiliary-authentication block-chain nodes. There are a variety of ways for selection, such as random selection, or when the temporary parameter is a random number, a maximum number or a minimum number may be selected from the temporary parameters as the session token. The session token is an identity identifier that will participate in subsequent session operations by the user.

In one embodiment, the session token as the temporary identity identifier is not generated by the application system, but is generated by the block-chain network. Due to the mechanism of the block-chain itself, the validity and randomness of the session token can be guaranteed, and it can avoid generating session tokens randomly after the system is compromised.

The authentication scheme or the multi-node authentication scheme proposed in some embodiments of the present disclosure may be used in combination with the authentication method in the related art, or may be used separately.

Figure 6:
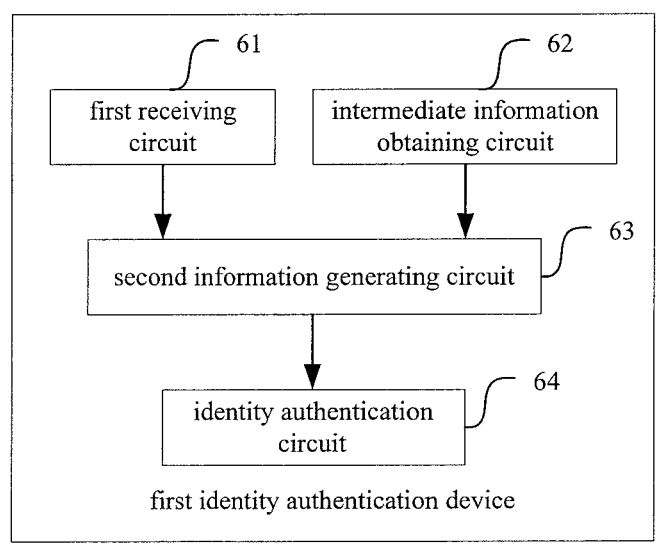
FIG. 6 is a schematic diagram of a first identity authentication device according to an embodiment of the present disclosure.

A first identity authentication device that implements the above method of the foregoing embodiment is described hereinafter. The first identity authentication device may be located in an authentication block-chain node. As shown in FIG. 6, the first identity authentication device includes a first receiving circuit 61, an intermediate information obtaining circuit 62, a second information generating circuit 63, and an identity authentication circuit 64.

The first receiving circuit 61 is configured to receive first information entered by the user when authenticating a user's identity.

The intermediate information obtaining circuit 62 is configured to obtain intermediate information of the user from the block-chain.

The second information generating circuit 63 is configured to generate second information by using the first information and the intermediate information.

The identity authentication circuit 64 is configured to determine whether the second information matches the result information pre-stored in the block-chain, and determine whether the user identity of the user is valid according to the matching result.

In an optional embodiment, the first identity authentication device further includes a first sending circuit. The first sending circuit is configured to send the first information received by the first receiving circuit 61 and a user identifier of the user to an auxiliary-authentication block-chain node.

The first receiving circuit 61 is further configured to receive a matching result returned from the auxiliary-authentication block-chain node.

The identity authentication circuit 64 may determine whether the second information matches the result information pre-stored in the block-chain and determine whether the user identity of the user is valid according to the matching result in a way including that the identity authentication circuit 64 may determine whether the second information matches the result information pre-stored in the block-chain to obtain a matching result of this local node, and then, in combination of the matching result of the local node and matching results returned by auxiliary-authentication block-chain nodes, the identity of the user is determined to be valid when there are more than a predetermined number of matching results indicated as matching among all matching results.

In one embodiment, in an optional manner, the first receiving circuit is further configured to receive a temporary parameter returned by the auxiliary-authentication block-chain node. The temporary parameter may be a random parameter generated by the auxiliary-authentication block-chain node. The first identity authentication device further includes a token selection circuit. The token selection circuit is configured to select one temporary parameter as a session token of the user from temporary parameters returned by the auxiliary-authentication block-chain nodes which each return a matching result indicated as matching.

Figure 7:
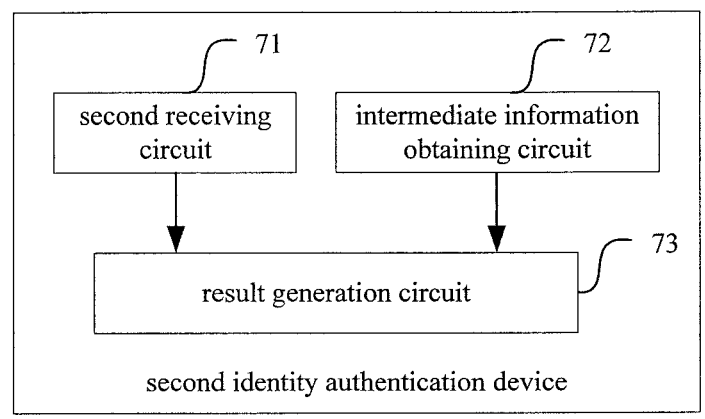
FIG. 7 is a schematic diagram of a second identity authentication device according to an embodiment of the present disclosure.

A second identity authentication device that implements the above method of the foregoing embodiment is described hereinafter. The second identity authentication device may be located in an auxiliary-authentication block-chain node. As shown in FIG. 7, the second identity authentication device includes a second receiving circuit 71, an intermediate information obtaining circuit 72, and a result generation circuit 73.

The second receiving circuit 71 is configured to receive user identifier and first information entered by the user sent from the authentication block-chain node.

The intermediate information obtaining circuit 72 is configured to obtain intermediate information of the user from the block-chain.

The result generation circuit 73 is configured to generate third information by using the first information and the intermediate information, determine whether the third information matches the result information pre-stored in the block-chain, and return a matching result to the authentication block-chain node.

In an optional embodiment, the second identity authentication device may further include a temporary parameter generation circuit configured to generate a random parameter as a temporary parameter and return the temporary parameter to the authentication block-chain node.

In the block-chain nodes, some of the block-chain nodes may be preset as the authentication block-chain nodes, and the other of the block-chain nodes may be preset as auxiliary-authentication block-chain nodes. It is also possible to preset that each of the block-chain nodes can be either the authentication block-chain node or the auxiliary-authentication block-chain node, that is, the first identity authentication device and the second identity authentication device can be located in the same block-chain node. When the first identity authentication device and the second identity authentication device are located in the same block-chain node, circuits with similar functions in the above devices can be combined. For example, the intermediate information obtaining circuit 62 of the first identity authentication device has the same functions as the intermediate information obtaining circuit 72 of the second identity authentication device, and then only one of the intermediate information obtaining circuit 62 and the intermediate information obtaining circuit 72 may be set. For another example, the first receiving circuit 61 of the first identity authentication device and the second receiving circuit 71 of the second identity authentication device may be combined; and the second information generating circuit 63 and the identity authentication circuit 64 of the first identity authentication device has similar functions as the result generation circuit 73 of the second identity authentication device, and then they may be combined. Those skilled in the art can know how to set the circuits according to the description in the above embodiments, and no further description is provided herein.

Application Example

In this example, the intermediate information and the result information are stored in the block-chain as an instance. The following steps (1-1)-(1-4) are procedures during registration, and steps (1-5)-(1-12) are procedures during authentication.

At the step 1-1, when a new user registers, several mnemonic words required by a business application for authenticating identity, are used as identity information.

Optionally, a hash value obtained by hashing the mnemonic words provided by the user may also be used as the identity information.

At the step 1-2, intermediate information is generated.

For example, one or more pieces of related information may be selected to generate the intermediate information. The related information includes, but is not limited to, user name, registration time, client address, server address, random number, and so on. There are many methods for generating the intermediate information, such as using a hash value of at least one piece of the above information as the intermediate information.

At the step 1-3, a value obtained by hashing the identity information and the intermediate information as result information.

At the step 1-4, the new user's registration event is broadcasted to the block-chain network, i.e., writing the intermediate information and the result information of the user into the block-chain.

At the step 1-5, when authenticating the identity, the authentication block-chain node for authentication receives an authentication request of the user. The authentication request includes user identifier and first information provided by the user for authenticating the identity.

An optional way is that when the user registers, after the identity information is provided, one or more obfuscated information is generated and saved together with the identity information. When authenticating the identity, the saved information is extracted as candidates, and the user selects the identity information from them. This helps to prevent the user from forgetting the mnemonic word, that is, the identity information, thereby ensuring that the authentication process can be smoothly performed.

At the step 1-6, the intermediate information of the user is obtained from the block-chain.

In this example, the authentication block-chain node is a block-chain node that is registered by the user. The authentication block-chain node records block header information. The block header information can be used to retrieve the block-chain, and then the intermediate information corresponding to the user can be found according to the user identifier. When the authentication block-chain node is not the block-chain node that is registered by the user, the authentication block-chain node can obtain the block header information from the block-chain node that is registered by the user.

At the step 1-7, second information is obtained by hashing the first information and the intermediate information.

At the step 1-8, whether the second information matches the result information in the block-chain is determined.

At the step 1-9, x other block-chain nodes are randomly selected as auxiliary-authentication block-chain nodes, identity authentication smart contracts in the auxiliary-authentication block-chain nodes are called and then the user's first information and user identity are transmitted to the identity authentication smart contracts in the auxiliary-authentication block-chain nodes.

At the step 1-10, the identity authentication smart contract of the selected auxiliary-authentication block-chain node performs hash calculation based on the received first information and the intermediate information obtained from the block-chain according to the user identifier, and determines whether the calculation result matches the result information in the block-chain, and then returns the matching result to the authentication block-chain node. Optionally, a random value is returned together when returning the matching result.

At the step 1-11, the authentication block-chain node determines whether the user is valid according to the matching result of the local node and the matching results of other auxiliary authentication nodes.

The majority principle can be adopted, that is, when more than half of the matching results are matched, the user is judged to be a valid user. When the multi-node authentication mechanism is not used, the step 1-11 can be directly performed after the step 1-8 to obtain a result of whether the user is valid.

At the step 1-12, when determining that the user is valid, one of random numbers provided by the auxiliary-authentication block-chain nodes which each returns a matching result indicated as matching, as a session token in the subsequent operation.

There are many algorithms for selecting random numbers as session tokens, which are not limited in this example. For example, one of the random numbers may be randomly selected as the session token.

Sequentially, the uses can change the mnemonic words without affecting the identify authentication process.

With the solution of this example, a separate authentication block-chain node can complete the authentication, or multi-node authentication can be performed by the authentication block-chain node as well as the auxiliary-authentication block-chain nodes. There are several optional authentication methods.

One embodiment of the present disclosure further provides a computer storage medium. The computer storage medium stores a computer program. After the computer program is executed, the identity authentication method provided by one or more of the foregoing embodiments can be implemented, for example, the method shown in FIG. 1 can be implemented.

One embodiment of the present disclosure further provides a computer equipment that includes a memory, a processor, and a computer program stored in the memory and executable on the processor. The processor is capable of implementing the identity authentication method provided by one or more of the foregoing embodiments when the program is executed.

It will be appreciated that the embodiments described herein may be implemented in hardware, software, firmware, middleware, microcode, or a combination thereof. For hardware implementation, the processor may be implemented in one or more Application Specific Integrated Circuits (ASICs), Digital Signal Processing (DSP), Digital Signal Processing Equipment (DSP Device, DSPD), Programmable Logic Device (PLD), Field-Programmable Gate Array (FPGA), Universal Central Processing Unit (CPU), Microcontroller (MCU), and other processing units having data processing capabilities and/or program execution capabilities of a logic operation device.

For a software implementation, the techniques described herein can be implemented by modules (e.g., procedures, functions, and so on) that perform the functions described herein. The software code may be stored in memory including non-transitory memory and executed by the processor. The memory may be integrated in the processor or external to the processor.

In the present disclosure, in order to facilitate understanding and description, in some paragraphs, the description of the functions utilizes descriptions such as function unit and function module that are corresponding to the function to be executed by the processor. As used herein, the functions are function entities, which are not necessarily corresponding to any physically or logically independent entities.

The processor may implement these functional entities in the form of executing software in the form of computer instructions, or programmatically implement the functional entities in one or more hardware modules or integrated circuits.

In the present disclosure, the memory may be, for example, a volatile memory and/or a non-volatile memory. The volatile memory may include, for example, a random access memory (RAM) and/or a cache or the like. The nonvolatile memory may include, for example, a read only memory (ROM), a hard disk, a flash memory, or the like.

The above are merely the preferred embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. A user identity authentication method comprising:
for a scenario in which user identity needs to be authenticated twice or for a scenario in which a user forgets a password and needs to retrieve the password, when authenticating the user identity of the user, receiving, by an authentication block-chain node, an authentication request from the user, and decrypting the authentication request by using a user public key to obtain first information input by the user included in the authentication request, and obtaining intermediate information different from the user public key of the user and result information from a block-chain network;
generating, by the authentication block-chain node, second information by using the first information and the intermediate information with a hash algorithm; and
obtaining, by the authentication block-chain node, a matching result by determining whether the second information matches the result information stored in the block-chain network, and determining whether user identity of the user is valid according to the matching result;
wherein the first information is different from a user identifier;
wherein the method further includes:
sending the user identifier of the user and the first information to auxiliary-authentication block-chain nodes, receiving matching results returned by the auxiliary-authentication block-chain nodes;
receiving temporary parameters returned by the auxiliary-authentication block-chain nodes; and
selecting one temporary parameter as a session token of the user from the temporary parameters returned by the auxiliary-authentication block-chain nodes which each return the matching result indicated as matching;

wherein the temporary parameters are random numbers generated by the auxiliary-authentication block-chain nodes.

2. The method of claim 1, wherein
the obtaining, by the authentication block-chain node, a matching result by determining whether the second information matches the result information stored in the block-chain network, and determining whether user identity of the user is valid according to the matching result, includes:
obtaining a matching result for the authentication block-chain node by determining whether the second information matches the result information stored in the block-chain network; and in combination of the matching result of the authentication block-chain node and matching results returned by auxiliary-authentication block-chain nodes, determining that the user identity of the user is valid when there are more than a first number of matching results indicated as matching among the matching result of the authentication block-chain node and the matching results returned by auxiliary-authentication block-chain nodes.

3. The method of claim 2, wherein the matching result returned by the auxiliary-authentication block-chain node is generated by the auxiliary-authentication block-chain node in a way that includes:
after the auxiliary-authentication block-chain node receives the user identifier and the first information input by the user from the authentication block-chain node;
obtaining the intermediate information of the user from the block-chain network;
generating third information by using the first information and the intermediate information with a hash algorithm;
determining whether the generated third information matches the result information stored in the block-chain network, thereby obtaining the matching result which is returned by the auxiliary-authentication block-chain node.

4. A non-transitory computer readable storage medium comprising a computer program stored thereon, wherein the program is executed by a processor to implement steps of the method of claim 1.

5. A computer equipment comprising: a memory, a processor, and a computer program stored in the memory and executable on the processor; wherein the processor implements steps of the method of claim 1 when executing the program.

6. The method of claim 1, wherein the intermediate information is generated based on related information when the user registers; and the related information includes at least one of user name, registration time, client address or server address.

7. The method of claim 6, wherein the result information is generated by using identity information and the intermediate information with a hash algorithm; the identity information is provided by the user when the user registers and different from the user identifier, and is configured to perform secondary authentication on the user identity to authenticate the user identity.

8. The method of claim 7, wherein the first information is different from the user name and the password; and the identity information is different from the user name and the password.

9. A user identity authentication method comprising:
for a scenario in which user identity needs to be authenticated twice or for a scenario in which a user forgets a password and needs to retrieve the password, when authenticating the user identity of the user, receiving, by an auxiliary-authentication block-chain node, user identifier and first information input by the user from an authentication block-chain node, and obtaining intermediate information different from a user public key of the user and result information from a block-chain network;
generating, by the auxiliary-authentication block-chain node, third information by using the first information and the intermediate information with a hash algorithm;
obtaining a matching result by determining whether the third information matches the result information stored in the block-chain network; and
returning, by the auxiliary-authentication block-chain node, the matching result to the authentication block-chain node;
wherein the first information is different from the user identifier;
wherein the method further includes;
generating, by the auxiliary-authentication block-chain node, a random number as a temporary parameter, and returning the temporary parameter to the auxiliary-authentication block-chain node, so that the authentication block-chain node selects one temporary parameter as a session token of the user from temporary parameters returned by auxiliary-authentication block-chain nodes which each return the matching result indicated as matching.

10. A non-transitory computer readable storage medium comprising a computer program stored thereon, wherein the program is executed by a processor to implement steps of the method of claim 9.

11. A computer equipment comprising: a memory, a processor, and a computer program stored in the memory and executable on the processor; wherein the processor implements steps of the method of claim 9 when executing the program.

12. The method of claim 9, wherein the intermediate information is generated based on related information when the user registers; and the related information includes at least one of user name, registration time, client address or server address.

13. The method of claim 12, wherein the result information is generated by using identity information and the intermediate information with a hash algorithm; the identity information is provided by the user when the user registers and different from the user identifier, and is configured to perform secondary authentication on the user identity to authenticate the user identity.

14. The method of claim 13, wherein the first information is different from the user name and the password; and the identity information is different from the user name and the password.

15. An identity authentication device comprising:
a first receiving circuit;
an intermediate information obtaining circuit;
a second information generating circuit; and
an identity authentication circuit;
wherein the first receiving circuit is configured to, for a scenario in which user identity needs to be authenticated twice or for a scenario in which a user forgets a password and needs to retrieve the password, when authenticating the user identity of the user, receive an authentication request from the user, and decrypt the authentication request by using a user public key to obtain first information input by the user included in the authentication request; wherein the first information is different from a user identifier; the first receiving circuit is further configured to receive temporary parameters returned by auxiliary-authentication block-chain nodes; the temporary parameters are random parameters generated by the auxiliary-authentication block-chain nodes;

the intermediate information obtaining circuit is configured to obtain intermediate information different from the user public key and result information of the user from a block-chain network;

the second information generating circuit is configured to generate second information by using the first information and the intermediate information with a hash algorithm;

the identity authentication circuit is configured to obtain a matching result by determining whether the second information matches the result information stored in the block-chain network, and determine whether user identity of the user is valid according to the matching result;

wherein the identity authentication device further includes a first sending circuit and a token selection circuit;

the first sending circuit is configured to send the first information received by the first receiving circuit and the user identifier of the user to the auxiliary-authentication block-chain node;

the token selection circuit is configured to select one temporary parameter as a session token of the user from the temporary parameters returned by the auxiliary-authentication block-chain nodes which each return the matching result indicated as matching.

16. The device of claim 15, wherein the first receiving circuit is further configured to receive a matching result returned from the auxiliary-authentication block-chain node;

the identity authentication circuit is further configured to obtain a matching result for an authentication block-chain node by determining whether the second information matches the result information stored in the block-chain network; in combination of the matching result of the authentication block-chain node and matching results returned by auxiliary-authentication block-chain nodes, determine that the user identity of the user is valid when there are more than a first number of matching results indicated as matching among the matching result of the authentication block-chain node and the matching results returned by the auxiliary-authentication block-chain nodes.

17. The device of claim 15, wherein the identity authentication device further includes:

a second receiving circuit; and a result generation circuit;

wherein the second receiving circuit is configured to receive the user identifier and the first information input by the user sent from an authentication block-chain node;

the result generation circuit is configured to generate third information by using the first information and the intermediate information with a hash algorithm, obtain a matching result by determining whether the third information matches the result information stored in the block-chain network, and return the matching result to the authentication block-chain node.

18. The device of claim 17, wherein the identity authentication device further includes: a temporary parameter generation circuit configured to generate a random parameter as a temporary parameter and return the temporary parameter to the authentication block-chain node.

19. The device of claim 15, wherein the intermediate information is generated based on related information when the user registers; and the related information includes at least one of user name, registration time, client address or server address.

20. The device of claim 19, wherein the result information is generated by using identity information and the intermediate information with a hash algorithm; the identity information is provided by the user when the user registers and different from the user identifier, and is configured to perform secondary authentication on the user identity to authenticate the user identity; the first information is different from the user name and the password; and the identity information is different from the user name and the password.

* * * * *